April 12, 1927.
L. S. ABBOTT
FIRE RECEIVING WALL
Filed April 15, 1926
1,624,200
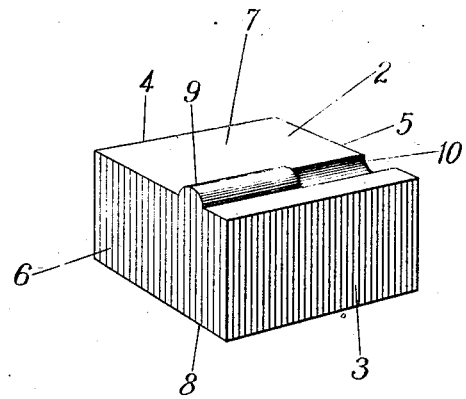
Fig 1
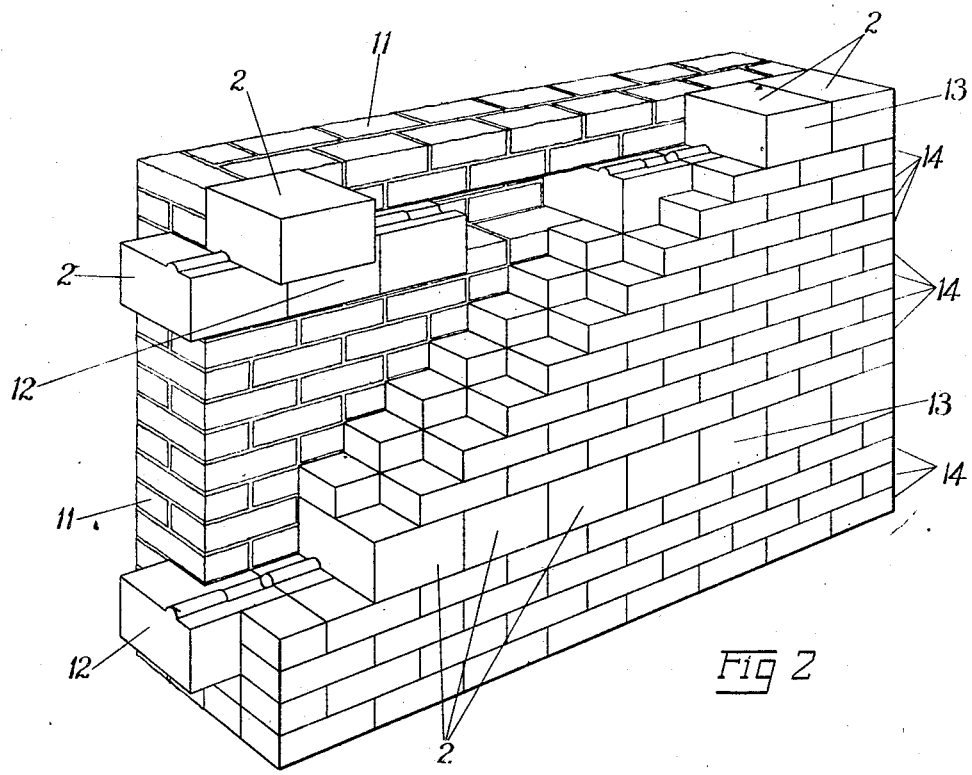
Fig 2
Inventor
Lyle Stockton Abbott
By 
Attorneys.

Patented Apr. 12, 1927.

1,624,200

UNITED STATES PATENT OFFICE.

LYLE STOCKTON ABBOTT, OF CHICAGO, ILLINOIS, ASSIGNOR TO CHICAGO FIRE BRICK COMPANY, OF CHICAGO, ILLINOIS, A CORPORATION OF ILLINOIS.

FIRE-RECEIVING WALL.

Application filed April 15, 1926. Serial No. 102,320.

My invention relates to wall tie blocks, and more particularly to such ties composed of ceramic materials, comprising means for tying the outside bearing wall of a furnace setting to the inner refractory lining.

My invention relates particularly to the composite walls of boiler settings, furnaces or other structures in which high temperatures are employed and has for its purpose the provision of an improved arrangement of blocks and bricks constituting the wall, whereby stresses are minimized in the lining, and great economies are obtained in the repair and maintenance of the furnace structure.

It is a further purpose of my invention to provide a block or brick of refractory material which will make the lining of such a furnace self-supporting and detachably connect or tie the outer or bearing wall of the setting to the more fire resistant, but structurally weaker, inside refractory wall.

It is the common and accepted practice to build the walls of boilers and other high temperature furnaces of two kinds or varieties of materials. The outside portion of the walls being relatively cool due to radiation can be, and usually is, constructed of common brick laid in lime or cement mortar. The inside portion of the walls which may be subjected to a temperature as high as 3000° F. is constructed of fire brick or similar refractory ceramic material, laid in a special mortar of high melting point clay or ceramic cement. Such an arrangement is economical and provides a setting in which the outer portion of the wall has great structural strength, and the inner portion is resistant to the high temperature within the furnace. There is however, a marked tendency for these two portions of the walls to become separated due to the divergent characteristics of the materials of which they are constructed and to differences in the coefficient of expansion of these materials.

Further, fire clay and similar ceramic bodies have but small strength when highly heated and hence are not good structural materials, though their use is necessitated on account of their resistance to deterioration under the action of high temperatures. The separation of the refractory lining from the outer bearing portion of the wall and the structural weakness of the refractory lining is the principal cause of rapid deterioration of boiler and furnace settings. Of recent years there has been a marked increase in the size of such structures, so that today it is common to build boiler walls from 35 to 40 feet in height, the interior faces of which are subjected to the full heat of the furnace, and in some cases similar walls of a height of 60 feet have been constructed.

My invention provides a means for tying the inner and outer portions of the walls together so that they do not become separated in service, and further provides a means for distributing the weight of the structurally weak, but fire resistant lining, to the outer bearing portion of the wall.

I accomplish this by incorporating in the walls a series of blocks of unique shape, composed of refractory ceramic materials.

Other objects and advantages of the invention will appear as the description of the accompanying drawing proceeds. However, I desire to have it distinctly understood that I do not limit myself to the exact details shown or described, but that I intend to include as part of my invention all such obvious changes and modifications of parts as would occur to a person skilled in this art and as would fall within the scope of the claims.

In the drawing:

Fig. 1 is a perspective view of one of the wall tie blocks forming a portion of my invention; and Fig. 2 is a fragmentary perspective view of a furnace wall in which the wall tie blocks shown in Fig. 1 have been incorporated.

In the drawing I show my improved block or title 2 of refractory ceramic material. Its size is determined largely by the dimensions of the various units of which the wall is composed, and is limited only by ease of handling on the work and by the requirements of manufacture. A convenient size is that of the volume of four standard fire brick, say 9" x 9" x 5⅛". The faces 3 and 4 are substantially parallel, and substantially are right angles to the ends 5 and 6 and to the top and bottom 7 and 8. On the top there is a tongue 9 of semi-circular cross section extending parallel to the front face and for a length but slightly less than half the width of the front face. In line with this tongue and extending to the end of the block is a groove 10 also of semicircular cross section, but of slightly greater dimension than of the tongue 9.

This relation between the tongue and groove permits the tongue on one of a pair of blocks to key or interlock with the groove of the other.

The position of these blocks in the wall and their relation to the bricks of which the wall is composed will be clearly understood by reference to Fig. 2. The outer, or bearing portion 11, of the wall is composed of common brick. At intervals tie blocks 2 are built into the wall 11 to form a course 12 so that half their depth is included in the wall, and the other half which embodies the tongue and groove portion extends beyond the face of the wall. These blocks are a permanent part of the wall 11, and since they are protected from the heat of the furnace do not deteriorate and hence do not need to be replaced. Superimposed on this course 12 is another course 13 in reversed relation, and each of the blocks of which it is composed are staggered in relation to the blocks in the course 12. This brings the tongues and grooves of the various blocks into relation as that the entire course 12 is keyed or interlocked with the course 13, making the tie continuous in effect, yet with the advantage that the course 13 can be replaced or repaired as deterioration occurs in service.

In between the courses 13 of blocks there is built any desired number of courses of fire brick 14. A convenient number is nine courses though it may be less or more. It will be apparent that the blocks 2 not only serve as a tie but they also bear the weight of the brick in any one section of wall between ties and transfer this weight to the load bearing portion of the wall 11. This has two distinct advantages. First, the weight of any one section is so low that even though the brick of which it is composed are fragile and of small compressive resistance, walls of any height desired can be built without risk of failure through crushing of the firebrick.

The second advantage lies in the ease of maintenance, for any portion of the wall can be repaired or replaced locally without disturbing the remainder of the wall.

That portion of the tie blocks which is incorporated in the refractory lining can be replaced as readily as the brick and without disturbing the load bearing portion of the wall.

It is obvious that many other shapes of keying faces can be used in lieu of the semi-circular tongue and groove as shown, and that other modifications may be made without departing from the spirit of my invention, having however thus described one form which my invention may take, what I claim as new and desire to secure by United States Letters Patent is:

1. A composite wall of the character described consisting of two sections, an outer section made of brick-like elements to constitute the weight supporting section, an inner section made of brick-like elements of refractory material, and refractory means arranged at intervals throughout the height of the wall to form a cross-tie between said sections, said means consisting of rows of complementary brick-like elements, one row anchored in the outer section of said wall and the other forming part of the inner section of said wall, the complementary brick elements of the rows being arranged one above the other and the rows each having interlocking projections and recesses cooperating with recesses and projections in the other row where said two rows are juxtaposed, said complementary elements forming a shelf to support the superposed refractory elements constituting the said inner section.

2. A composite wall of the character described consisting of two sections, an outer section made of brick-like elements to constitute the weight supporting section, an inner section made of brick-like elements of refractory material, and means arranged at intervals throughout the height of the wall to form a cross-tie between said sections and to support the brick-like refractory elements between each such means and the said means next above, said means consisting of a plurality of complementary elements of refractory material some of which are secured in each section, each of said complementary elements in one section having means thereon interlocking with a plurality of the corresponding elements in the other section, said means locking the elements against movement transversely or longitudinally of the walls.

3. A composite wall of the character described consisting of two sections, an outer section made of brick-like elements to constitute the weight supporting section, an inner section made of brick-like elements of refractory material, and refractory means arranged at intervals throughout the height of the wall to form a cross-tie between said sections and to support the brick-like refractory elements between each such means and the said means next above, said means consisting of a plurality of complementary elements of refractory material some of which are secured in each section, each of said complementary elements in one section having a projection thereon and a recess therein engaging corresponding recesses and projections in the elements of the other section.

4. A composite wall of the character described consisting of two sections, an outer section made of brick-like elements to constitute the weight supporting section, an inner section made of brick-like elements of refractory material, and shelf-like means arranged at intervals throughout the height of the wall to form a cross-tie between said sections and to support the brick-like refractory elements between each such means and the said means next above, said means consisting of a plurality of complementary elements of refractory material some of which are mounted in each wall section, certain of said complementary elements having a projection thereon engaging a recess in one of the complementary elements in the other section, and a recess therein receiving a projection on a complementary element adjacent the first named complementary element in the other section.

5. A block of the character described made of refractory material having a section of substantially rectangular outline adapted to be built into a wall and having a protruding shelf section provided with interlocking means adapted to co-operate with a companion block said interlocking means comprising a recess in said shelf section and a projection extending from said shelf section, said projection and recess being spaced the same distance from the end of said shelf section.

6. A block of the character described made of refractory material having a section adapted to be built into a wall and having a protruding shelf section provided with interlocking means adapted to co-operate with a companion block, said means comprising a projection extending from said block and a recess in the block of the same contour as the projection, to receive a corresponding projection on a companion block.

7. A composite wall of the character described consisting of two sections, an outer section constituting the weight supporting section, and an inner section of brick-like elements of refractory material and crosstie means arranged at intervals throughout the height of the wall comprising blocks set in the weight supporting section and projecting into the inner section, other blocks in the inner section having portions resting on the projecting portions of said first named blocks, the engaging portions of said blocks each having alternate projections and recesses thereon to hold said blocks in interlocking engagement.

8. A composite wall of the character described comprising an outer section constituting the weight supporting section and an inner section of brick like elements of refractory material, and crosstie means arranged to secure the sections together comprising blocks secured in the weight supporting section and projecting from said section, other blocks which are duplicates of said first named blocks in the inner section having portions resting on the projecting portions of said first named blocks, the engaging portions of said blocks having duplicate interlocking means thereon to hold said blocks in interlocking engagement.

9. A composite wall of the character described comprising an outer wall section constituting the weight supporting section and an inner wall section of refractory material, and means for tying said sections together comprising a row of tie pieces secured in said outer section, a row of tie pieces secured in said inner section, said tie pieces being duplicates and having duplicate interlocking means thereon securing said two rows together.

In witness whereof, I hereunto subscribe my name this 13th day of April A. D., 1926.

LYLE STOCKTON ABBOTT.